United States Patent [19]

Utsumi

[11] Patent Number: 4,814,221

[45] Date of Patent: Mar. 21, 1989

[54] POLYETHYLENE-2,6-NAPHTHALATE FILM FOR CAPACITOR

[75] Inventor: Shigeo Utsumi, Yokohama, Japan

[73] Assignee: Diafoil Company, Limited, Tokyo, Japan

[21] Appl. No.: 938,957

[22] Filed: Dec. 8, 1986

[30] Foreign Application Priority Data

Dec. 9, 1985 [JP] Japan .............................. 60-276648

[51] Int. Cl.$^4$ ..................... B32B 5/16; B32B 27/36
[52] U.S. Cl. ................................ 428/220; 428/323; 428/480
[58] Field of Search ................ 428/323, 480, 220; 264/211.18, 210.7, 290.2, 288.8

[56] References Cited

U.S. PATENT DOCUMENTS

| | | | |
|---|---|---|---|
| 3,937,754 | 2/1976 | Shimotsuma et al. | 264/210.7 |
| 4,198,458 | 4/1980 | Mitsuishi et al. | 428/323 X |
| 4,497,865 | 2/1985 | Minami et al. | 264/210.7 X |
| 4,555,746 | 11/1985 | Mochizuki et al. | 361/323 |
| 4,729,915 | 3/1988 | Sakamoto et al. | 428/480 X |
| 4,732,799 | 3/1988 | Sakamoto et al. | 428/141 |

FOREIGN PATENT DOCUMENTS

| | | | |
|---|---|---|---|
| 59-127828 | 7/1984 | Japan | 361/323 |
| 60-68505 | 4/1985 | Japan | 361/323 |

*Primary Examiner*—Thomas J. Herbert
*Attorney, Agent, or Firm*—Oblon, Fisher, Spivak, McClelland & Maier

[57] ABSTRACT

A polyethylene-2,6-naphthalate film for capacitors and, in particular, a polyethylene-2,6-naphthalate film which is excellent in heat resistance and mechanical strength and is useful for the dielectric of a chip type plastic film capacitor which requires a very thin film.

3 Claims, No Drawings

POLYETHYLENE-2,6-NAPHTHALATE FILM FOR CAPACITOR

BACKGROUND OF THE INVENTION

The present invention relates to a polyethylene-2,6-naphthalate film for capacitors and, more particularly, to a polyethylene-2,6-naphthalate film which is excellent in heat resistance and mechanical strength and is useful for the dielectric of a chip type plastic film capacitor which requires a very thin film.

As is well known, as a film for plastic film capacitors, a biaxially oriented polyethylene terephthalate film or a biaxially oriented polypropylene film is conventionally used. Recently, a thinner film has been demanded in order to improve the dielectric properties of a capacitor. For example, an attempt has been made on a biaxially oriented polyethylene terephthalate film of 1.5 $\mu$m thick. A conventional very thin film of polyethylene terephthalate or polypropylene, however, has disadvantage that it often produces breakage during vacuum deposition because of its low strength.

With the miniaturization of electric and electronic equipments, high-density electronic parts have been developed. As a useful means for densifying electronic parts, they have been produced in the form of chips. Among various kind of capacitors, only ceramic capacitors have hitherto been capable of being produced in the form of chips, but recently it is possible to produce a tantalum electrolytic capacitor and an aluminum electrolytic capacitor in the form of chips.

In the case of a plastic film capacitor, however, the heat resistance of a plastic film itself, which used as a dielectric, is low and when it is immersed in a bath of molten solder, critical defects such as the deformation of the base film, the degradation of the dielectric properties and the short-circuit between the lead wires are produced, thereby making it difficult to be produced in the forms of a chip. On the other hand, since a heat-resistance film now on the market is too large in thickness to obtain adequate capacity and too large in a dielectric loss tangent, and costs too much, it is unsuitable as the dielectric of a capacitor.

Accordingly, it is an object of the present invention to eliminate the above-described problems in the prior art and to provide a film which is excellent in strength, the soldering temperature resistance and the dielectric properties as a capacitor, and is not degraded much due to heat even if it is as thin as less than 2.5 $\mu$m. As a result of the researches of the present inventor to achieve this aim, it has been found that a film having a degree of crystallinity of not smaller than 40% obtained by the biaxial orientation of polyethylene-2,6-naphthalate having an intrinsic viscosity of not smaller than 0.40 exhibits a Young's modulus of not smaller than 600 kg/mm$^2$ both in the longitudinal direction (the machine direction) and in the transverse direction, and is excellent in the soldering temperature resistance and the dielectric properties as a capacitor even if it is as thin as 2.5 $\mu$m or less, and that it is therefore suitable as a plastic film capacitor, in particular, as the dielectric of a chip type plastic film capacitor. The present invention has been accomplished on the basis of this finding.

SUMMARY OF THE INVENTION

In the first aspect of the present invention, provided is a polyethylene-2,6-naphthalate film for plastic film capacitors having a Young's modulus of not smaller than 600 kg/mm$^2$ both in the machine direction and in the transverse direction and a degree of crystallinity of not smaller than 40%.

In the second aspect of the present invention, provided is a method of producing a polyethylene-2,6-naphthalate film for plastic film capacitors having a Young's modulus of not smaller than 600 kg/mm$^2$ both in the machine direction and in the transverse direction and a degree of crystallinity of not smaller than 40%, comprising the steps of:

melt-extruding polyethylene-2,6-naphthalate which contains 0.01 to 1 wt % of inactive (inert) fine particles having a primary particle diameter of 0.001 to 10 $\mu$m and has an intrinsic viscosity of not smaller than 0.40 into a film, stretching the film by 1.1 to 3.5 times in the machine direction at a temperature of 120° to 170° C., stretching the film by 2.5 to 5.0 times in the transverse direction at a temperature of 120° to 180° C., heatsetting the film at a temperature of 130° to 240° C. while subjecting the film to relaxation by 1 to 30% in the transverse direction, re-stretching the film by 1.2 to 4.0 times in the machine direction at a temperature of 140° to 200° C., heatsetting the film at a temperature of 240° C. to the melting point while re-stretching the film by 1.03 to 1.5 times in the transverse direction, and winding the film while subjecting the film to relaxation by 1 to 10% in the machine direction and in the transverse direction.

In the third aspect of the present invention, provided is a plastic film capacitor comprising a dielectric which is made of a polyethylene-2,6-naphthalate film having a Young's modulus of not smaller than 600 kg/mm$^2$ both in the machine direction and in the transverse direction and a degree of crystallinity of not smaller than 40%.

DETAILED DESCRIPTION OF THE INVENTION

The present invention provides a polyethylene-2,6-naphthalate film for capacitors having a degree of crystallinity of not smaller than 40% and a Young's modulus of not smaller than 600 kg/mm$^2$ both in the machine direction and in the transverse direction.

A polyethylene-2,6-naphthalate film according to the present invention exhibits a high mechanical strength (a Young's modulus of not smaller than 600 kg/mm$^2$) both in the machine direction and in the transverse direction, and is excellent in the dielectric properties as a capacitor and the soldering temperature resistance. Furthermore, since dielectric properties thereof are not degraded much due to heat, it is useful as a dielectric of a plastic film capacitor, especially, of a chip type plastic film capacitor which requires a very thin film.

The polyethylene-2,6-naphthalate in the present invention means a polymer in which the constitutional unit of molecule substantially comprises ethylene-2,6-naphthalate unit, and includes modified ethylene-2,6-naphthalate polymer which is modified with a slight amount of, for example, less than 10%, preferably less than 5%, a third component.

Polyethylene-2,6-naphthalate is generally prepared by polycondensing naphthalene-2,6-dicarboxylic acid or a derivative thereof such as methyl naphthalene-2,6-dicarboxylate and ethylene glycol in the presence of a catalyst under an appropriate reaction condition. As a third component used for obtaining a modified polymer are usable dicarboxylic acids such as adipic acid, oxalic acid, isophthalic acid, terephthalic acid, naphthalene-2,7-dicarboxylic acid and diphenyl ether dicarboxylic acid or lower alkyl esters thereof; oxycarboxylic acids such as p-oxybenzoic acid and p-oxyethoxybenzoic acid or lower alkyl esters thereof; diols such as propylene glycol, trimethylene glycol, tetramethylene glycol, pentamethylene glycol, hexamethylene glycol and diethylene glycol; and polyalkylene glycol such as polyethylene glycol and polytetramethylene glycol. In polymerization, a stabilizer such as phosphoric acid, phosphorous acid and an ester thereof; an antioxidant such as hindered phenol; a polymerization modifier, a crystallization modifier; and a plasticizer may be added in the range in which the characteristics of a polyethylene-2,6-naphthalate film of the present invention are not impaired.

Since too low a degree of polymerization of a polyethylene-2,6-naphthalate lowers the mechanical strength of the film, it is preferable that the polymer has an intrinsic viscosity measured in the mixed solvent of phenol and 1,1,2,2-tetrachloroethan (1:1) at a temperature of 30.0° C. of not smaller than 0.4, preferably 0.6 to 0.9.

In order to provide a good workability during the production of a capacitor, it is necessary to provide an appropriate roughness on the surface of the film of the present invention by adding a fine inactive particle into the film. The center line average roughness Ra is preferably 0.01 to 1.0 μm. If Ra is smaller than 0.01 μm, the film is too even to obtain a good workability. On the other hand, if Ra is larger than 1.0 μm, the protuberance of the film are so large that the dielectric properties is disadvantageously degraded due to the air present between the films when they are made into a capacitor.

One of the methods of adding inactive fine particles into the film is a method of separating fine particles by reacting a metal compound which is dissolved in a reaction system with a phosphoric compound during the preparation of polyethylene-2,6-naphthalate, for example, after the ester interchange reaction. This method is called a particle separating method and is preferable because it produces little coarse particles.

What is called a particle addition method is an easier method. This is a method of mixing inactive fine particles in a step between the step of preparing polyethylene-2,6-naphthalate and the step of extruding for the film formation. As the inactive fine particles the fine particles of kaolin, talc, silica, magnesium carbonate, calcium carbonate, barium carbonate, calcium sulfate, barium sulfate, lithium phosphate, calcium phosphate, magnesium phosphate, aluminum oxide, silicon oxide, titanium oxide, lithium fluoride, Ca, Ba, Zn and Mn salts of terephthalic acid and carbon blacks may be exemplified. Such inactive fine particles may be used singly or simultaneously two or more kinds selected from the above described group. They may be spherical, bulky or flaky in shape, and there is no special restriction in the hardness, specific gravity, color or the like of the fine particles, either. The average primary particle diameter of the inactive fine particles is 0.001 to 10 μm, preferably 0.001 to 3 μm. The amount of the fine particles to be added to the film is 0.01 to 1 wt %, preferably 0.05 to 0.8 wt %, and more preferably 0.1 to 0.8 wt %.

The Young's modulus of the polyethylene-2,6naphthalate film of the present invention is not smaller than 600 kg/mm$^2$ both in the machine direction and in the transverse direction. Preferably, the Young's modulus in the machine direction is not smaller than 800 kg/mm$^2$, and more preferably not smaller than 1,000 kg/mm$^2$. If the Young's modulus is less than 600 kg/mm$^2$, a very thin film would be inconveniently broken at the time of vacuum deposition.

The degree of crystallinity is not smaller than 40%, preferable 50%. A small degree of crystallinity degrades the dimensional stability of the film and lowers the soldering temperature resistance, resulting in the degradation of the dielectric properties as a capacitor due to heat. In order to keep the dimensional stability, the shrinkage of the film should be not greater than 5%, preferably 3%, and more preferably 2% both in the machine direction and in the transverse direction measured after it has been heat treated at 150° C. in 30 minutes.

It is possible to form the polyethylene-2,6naphthalate film according to the present invention into a given thickness according to purposes. When it is used as the dielectric of a chip type plastic film capacitor which requires a very thin film, the thickness is preferably not more than 2.5 μm, more preferably 0.5 to 2.5 μm and still more preferably 0.5 to 1.5 μm.

The polyethylene-2,6-naphthalate film according to the present invention is produced, for example, in the following process.

Generally, polyethylene-2,6-naphthalate containing fine particles is produced by a conventional method, and is thereafter formed into pellets. It is also preferable to charge the polymer obtained into an extruder in a molten state, to filter out coarse particles by a filter and thereafter to form the polymer into pellets. A pellet is dried, melt-extruded at 280° to 320° C. and cooled to be hardened, thereby obtaining an unstretched film of substantially non-orientation. It is preferable to filtrate during melt-extrusion. It is also preferable to use a multistage filter, if necessary. When cooling and hardening the extruded polymer, a known method for bringing the extruded polymer into close contact with a casting drum, an electrostatic cooling method is preferably adopted. The unstretched sheet is first stretched in the machine direction by 1.1 to 3.5 times, preferably 1.5 to 2.5 times at a temperature of 120° to 170° C. At this time, it may be stretched either at one stage or multi stages. The film obtained in this way is next stretched in the transverse direction by a tenter by 2.5 to 5.0 times at a temperature of 120° to 180° C. In order to lessen the non-uniform portions in thickness in the transverse direction, the film is preferably stretched by 3.5 to 5.0 times. The biaxially oriented film obtained in this way is heat treated at 130° to 240° C. while subjecting the film to relaxation in the transverse direction by 1 to 30%. The thus heat-treated film is re-stretched in the machine direction at 140° to 200° C. by 1.2 to 4.0 times. While the film is being further stretched in the transverse direction at a temperature of 240° C. to the melting point of the polyethylene-2,6-naphthalate used by 1.5 times, the film is heatset. Thereafter, while being subjected to relaxation both in the machine direction and in the transverse direction by 1 to 10% in a cooling zone, the film is wound.

The polyethylene-2,6-naphthalate according to the present invention obtained in this way has a Young's modulus of not smaller than 600 kg/mm$^2$ both in the machine direction and in the transverse direction, a degree of crystallinity of not smaller than 40%, a shrinkage of not greater than 5% in the machine direction and in the transverse direction measured after heat treatment at 150° C. for 30 minutes and a center line average roughness Ra of 0.01 to 1.0 μm. Thus, the film according to the present invention has characteristics useful as a very thin film, in particular, of not greater than 2.5 μm thick, which is used as the dielectric of a chip type plastic film capacitor.

A plastic film capacitor adopting the polyethylene-2,6-naphthalate film of the present invention is produced by the following ordinary method.

A metal, e.g., aluminum is vacuum deposited to one surface of the polyethylene-2,6-naphthalate film according to the present invention. The thus metallized film is wound up and both end surfaces of the wound up element are subjected to metallikon by using zinc, solder or the like. Lead wires are connected to both end surfaces, thereby obtaining a plastic film capacitor adopting the polyethylene-2,6-naphthalate film according to the present invention.

The present invention will be explained in more detail with reference to the following non-limitative examples. The physical properties of the films obtained in the examples were measured in the following method.

(1) Young's modulus

Young's modulus was measured at 25° C. and 50% RH by a Tensilon UTM-III produced by Toyo Boldwin Co., Ltd. under the following conditions:
sample: film of 15 cm long and 1 cm wide
space between chucks: 10 cm
rate of pulling: 100%/min

(2) Heat shrinkage

The heat shrinkage was measured after a sample had been left at 150° C. for 30 minutes in a non-stretched state in an oven. The heat shrinkage was obtained by $[(l_0-l)/l_0]\times 100$ (%), wherein $l_0$ is the original length and $l$ is the measured length

(3) Center line average roughness (Ra:μm)

The surface roughness was obtained in the following way by using a surface roughness measuring machine (SE - 3FK) produced by Kosaka Kenkyusho. The radius of the tip of the contact needle was 5 μm, and the load was 30 mg. From the surface curve of the film, a portion of a length of L (2.5 mm) was sampled along the center line. The roughness curve is represented by $y=f(x)$ by assuming the center line of the sampled portion as the axis X, the direction perpendicular thereto as the axis Y, and the center line average roughness [Ra(μm)] is obtained from the following formula:

$$Ra = \frac{1}{L} \int_0^L |f(x)|dx$$

No extreme value was cut off. Ra was obtained by the average value at 5 points in the machine direction and 5 points in the transverse direction, namely, at 10 points in total.

(4) Degree of crystallinity

The density was measured at 25° C. by using a density-gradient tube of a mixed solvent of carbon tetrachloride and n-heptane. The densities of the amorphous phase of polyethylene naphthalate and the crystalline phase thereof were assumed to be 1.325 and 1.407, respectively, and the degree of crystallinity was determined in accordance with the following formula:

$$\text{degree of crystallinity} = \frac{\rho - 1.325}{1.407 - 1.325} \times 100 \ (\%)$$

wherein $\rho$ is the density (g/cc) of the film obtained.

EXAMPLES 1, 2 and Comparative Example 1

[Preparation of Polyethylene-2,6-naphthalate]

100 parts of dimethyl naphthalene-2,6-dicarboxylate, 60 parts of ethylene glycol and 0.1 part of calcium acetate mono hydrate were charged into a reactor to carry out ester interchange reaction. The temperature was initially 180° C, and the temperature was gradually raised with the distillation of methanol until the temperature reached 230° C. after 4 hours, thereby completing the ester interchange reaction.

After 0.04 part of phosphoric acid was added to the reaction mixture, 0.30 part of calcium carbonate having an average particle diameter of 2.0 μm and 0.04 part of antimony trioxide were added thereto to carry out polycondensation by an ordinary method. The temperature was gradually raised and the pressure was gradually reduced from atmospheric pressure with the size of the temperature, until the temperature reached 290° C. and the pressure 0.3 mmHg after 2 hours.

When 4 hours had passed from the initiation of the reaction, the reaction was stopped to discharge polyethylene-2,6-naphthalate under a nitrogen pressure, which was formed into pellets.

The intrinsic viscosity of the polyethylene-2,6-naphthalate obtained was 0.68.

[Production of a Polyethylene-2,6-naphthalate Film]

The thus-obtained polyethylene-2,6-naphthalate pellet was extruded at 295° C. by an extruder into an amorphous sheet by an electrostatic cooling method. The amorphous sheet obtained was stretched in the machine direction by 2.5 times at 140° C. and in the transverse direction by 4.2 times at 135° C. It was heatset at 210° C. while being subjected to relaxation by 10%. The heatset film was restretched at 150° C. in the machine direction by 1.45 times. Thereafter, while tentering the film in the transverse direction by 1.1 times, the film was heatset for 10 seconds at 230° C., 250° C. and 265° C. (Comparative Example 1, Example 1 and Example 2, respectively). Each film was wound while being subjected to relaxation in the machine and the transverse directions by 4%. The thickness of the thus-obtained films were 1.6 μm. The physical properties of the films are shown in Table 1.

Onto one surface of the film, aluminum was vacuum deposited in a band of 20 mm wide (the marginal portions of 3 mm wide on both sides thereof), and the film was wound after one marginal portion was removed. Two metallized films were put together with the respective marginal portions situated on the opposite sides, and were wound up. Lead wires were attached to the end surfaces of the wound film, then end surfaces were subjected to metallikon, thereby obtaining a capacitor. Each capacitor obtained was immersed in a bath of molten solder at 260° C. for 5 seconds to examine the soldering temperature resistance. In Examples 1 and 2, the soldering temperature resistances were good, but in Comparative Example 1, the initial properties were degraded. The results are shown in Table 2.

EXAMPLE 3

A polyethylene-2,6-naphthalate film of 1.0 μm thick was obtained by the same manner as in Example 2 except that the film was re-stretched in the machine direction by 2.4 times in place of 1.45 times. The properties of the film are shown in Table 1.

A capacitor was produced in the same manner as in Example 1 to examine the initial properties and the soldering temperature properties. The results are shown in Table 2.

COMPARATIVE EXAMPLE 2

When a polyethylene terephthalate film (1.5 μm thick) on the market was subjected to vacuum deposition, the film was often broken during the deposition. When the soldering temperature resistance was examined, the characteristics were degraded much and it was impossible to use a polyethylene terephthalate film in a chip type capacitor. The initial properties and the soldering temperature resistance of the capacitor made by using a polyethylene terephthalate film in the same manner as in Example 1 are shown in Table 2.

TABLE 1

| | | Example 1 | Example 2 | Example 3 | Comparative Example 1 |
|---|---|---|---|---|---|
| Young's Modulus (kg/mm$^2$) | Machine Direction | 720 | 700 | 1050 | 740 |
| | Transverse Direction | 660 | 650 | 630 | 680 |
| Degree of Crystallinity (%) | | 48 | 52 | 52 | 35 |
| Heat Shrinkage (%) | Machine Direction | 1.5 | 1.2 | 1.9 | 1.9 |
| | Transverse Direction | 1.6 | 1.3 | 1.5 | 2.0 |
| Center line average roughness Ra (μm) | | 0.22 | 0.23 | 0.20 | 0.23 |

TABLE 2

| | Initial Properties | | | After immersing in a bath of molten solder | | |
|---|---|---|---|---|---|---|
| | Capacity (nF) | Dielectric Loss Tangent (%) | Insulation Resistance (Ω) | Capacity (nF) | Dielectric Loss Tangent (%) | Insulation Resistance (Ω) |
| Example 1 | 10.5 | 0.32 | $1.5 \times 10^{12}$ | 9.0 | 0.35 | $1.3 \times 10^{12}$ |
| Example 2 | 10.5 | 0.32 | $1.5 \times 10^{12}$ | 10.5 | 0.32 | $1.5 \times 10^{12}$ |
| Example 3 | 12.0 | 0.32 | $1.2 \times 10^{12}$ | 10.0 | 0.35 | $1.1 \times 10^{12}$ |
| Comparative Example 1 | 10.5 | 0.32 | $1.5 \times 10^{12}$ | 5.8 | 3.05 | — |
| Comparative Example 2 | 10.0 | 0.40 | $1 \times 10^{12}$ | 3.8 | 4.18 | — |

What is claimed is:

1. A film for plastic film capacitors consisting essentially of a polyethylene-2,6-naphthalate film having a Young's modulus of not smaller than 600 kg/mm$^2$ both in the machine direction and in the transverse direction, a degree of crystallinity of not smaller than 40%, and containing 0.01 to 1 wt. % of inactive fine particles having a primary particle diameter of 0.001 to 10 μm.

2. A polyethylene-2,6-naphthalate film for plastic film capacitors according to claim 1, wherein the thickness of said film is not greater than 2.5 μm.

3. A polyethylene-2,6-naphthalate film for plastic film capacitors according to claim 1, wherein said capacitor is a chip type film capacitor.

* * * * *